United States Patent [19]

Walker et al.

[11] 3,809,810

[45] May 7, 1974

[54] MULTICHANNEL ACCESS SWITCHING SYSTEM

[75] Inventors: Walter P. Walker, Atlanta; Douglas R. Cobb, Dunwoody; Frank H. Cofer, Jr., Atlanta, all of Ga.

[73] Assignee: The Audichron Company, Atlanta, Ga.

[22] Filed: Apr. 21, 1972

[21] Appl. No.: 246,322

[52] U.S. Cl........ 179/1 B, 179/100.1 PS, 179/6 TA

[51] Int. Cl............................................. G09b 5/04

[58] Field of Search........... 179/1 B, 6 TA, 100.1 C, 179/100.1 PS

[56] References Cited

UNITED STATES PATENTS

| | | | |
|---|---|---|---|
| 3,426,339 | 2/1969 | Rich et al. | 179/1 B |
| 3,479,467 | 11/1969 | Kirby et al. | 179/18 AD |
| 3,614,322 | 10/1971 | Joslow | 179/1 B |
| 3,199,226 | 8/1965 | Joslow | 179/1 B |
| 2,031,074 | 2/1936 | Scheibell | 179/100.1 PS |

*Primary Examiner*—Kathleen H. Claffy
*Assistant Examiner*—Douglas W. Olms
*Attorney, Agent, or Firm*—Jones, Thomas & Askew

[57] ABSTRACT

Switching system for selective interconnection of message receiving circuits, such as telephone trunk lines, and message delivery circuits, such as recorded message announcement circuits. The system, which operates in conjunction with a conventional telephone switching system, permits a single set of announcement trunks to be dedicated for shared use with multiple message announcement circuits. A unique number code is provided corresponding to each particular message announcement circuit, and the dialled number codes are decoded and then utilized to control the switching interconnection between the particular message announcement circuit and all announcement trunks which are awaiting connection with that particular announcement circuit. The announcement trunks are not dedicated or otherwise restricted to use with a particular message announcement circuit, and so several message announcement circuits having message load factors which peak at different intervals throughout the day may be used in shared relation with a common group of announcement trunks dedicated to a group of message announcement circuits.

18 Claims, 2 Drawing Figures

MULTICHANNEL ACCESS SWITCHING SYSTEM

Figure 1:
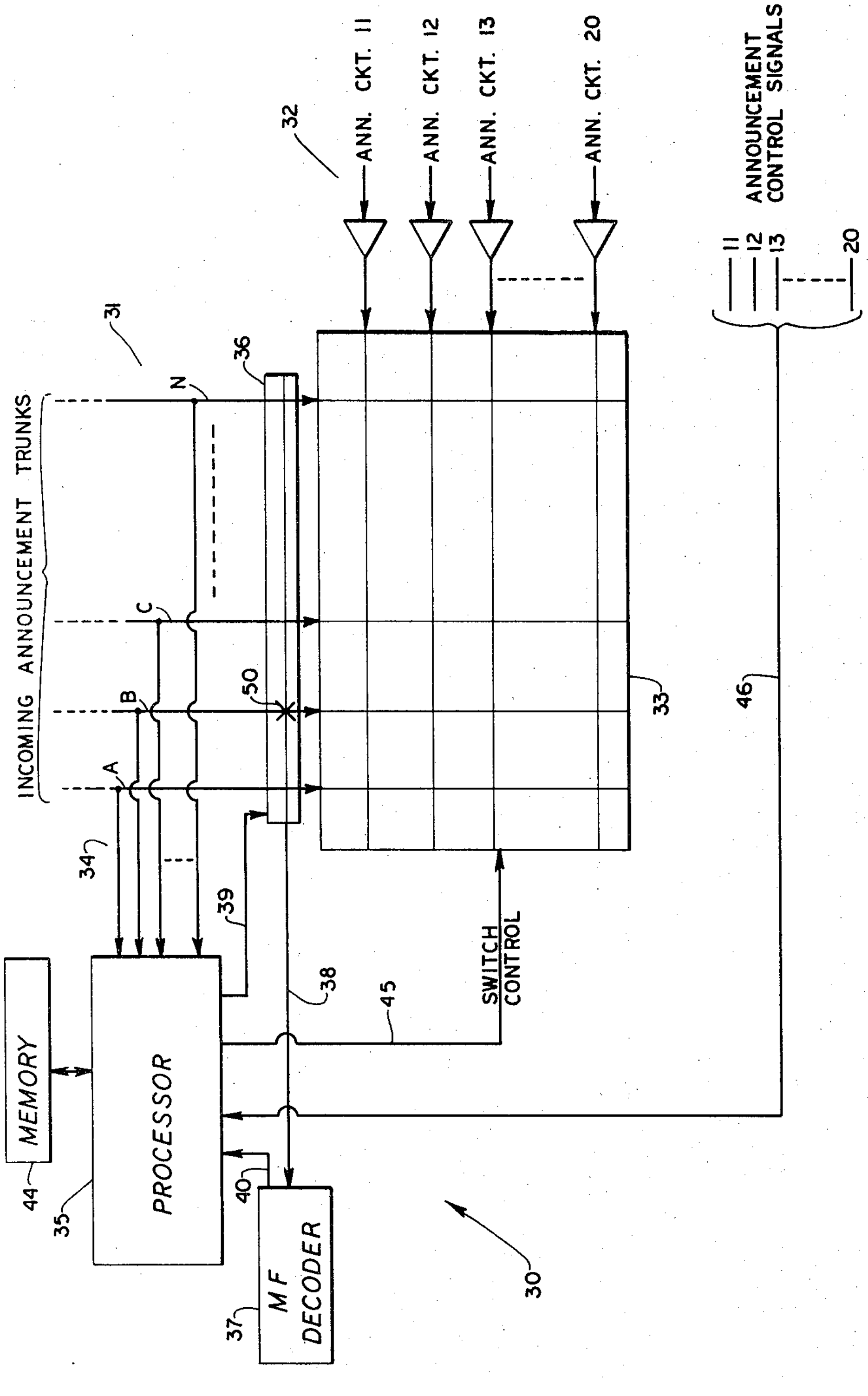

This invention relates in general to switching systems and in particular to a switching system for selective interconnection between multiple announcement circuits and one or more announcement trunks.

It is known in the prior art to provide message announcement apparatus connected in conjunction with conventional telephone systems to enable a telephone user to obtain a recorded message announcement by dialing a certain number. Typical examples of such recorded message announcement service are found in the recorded time, recorded temperature, and recorded weather forecast announcement services which are frequently available to telephone users, especially in the larger metropolitan areas. It has been determined that general interest recorded announcements of these kinds, if provided, enjoy widespread acceptance and use by telephone subscribers, and so a sizeable number of telephone trunk circuits must be provided for connection with a particular recorded message announcement to minimize the probability that a subscriber dialing the number of a particular recorded message announcement will receive a busy signal.

The use of recorded announcement apparatus to provide a popular announcement service such as a weather forecast announcement, for example, has required so great a number of telephone trunk circuits, due to the popularity of the service at certain peak times of day, that an entire central office prefix must, in effect, be dedicated to the use of only that particular announcement service. In other words, the demand for trunk circuits is sufficiently great that an entire central office prefix "NNX" code must be set aside for that announcement service alone, with the result that 10,000 possible subscriber numbers are made unavailable for assignment to the telephone subscribers.

The problem of trunk circuit capacity for recorded message announcements is compounded where a number of different popular recorded message services is desired to be offered, since each such announcement service in the prior art required dedication of a separate group of telephone trunk circuits sufficient to meet the peak demand for the particular type of announcement service. With the advent of multichannel message announcement apparatus such as the apparatus disclosed in U.S. Pat. Application Ser. No. 140,195, filed May 4, 1971, having the capability of delivering several different announcements from a common apparatus, the problem presented by trunk circuit dedication to a particular message announcement service is greatly increased in view of the substantial cost of providing such dedicated trunk circuits for the sponsor of the particular announcement service. This dedication of trunk circuits is particularly expensive where trunk circuits are provided for peak traffic loads which may occur for one or more relatively short periods throughout the day, and where other message announcements provide service in which peak loads occur during low-traffic periods of the first-mentioned announcement service. Since the telephone trunk circuits in the prior art have been dedicated to a particular announcement service, it has not been possible for an idle announcement trunk circuit to be connected with a different message announcement circuit at the control of the subscriber dialing the number of that particular announcement.

Accordingly, it is an object of the present invention to provide an improved switching system.

It is another object of the present invention to provide a switching system for selectively connecting one or more trunk circuits to a predetermined one of multiple message circuits.

It is still another object of the present invention to provide a switching system in which any one of a number of message channels can be connected to one or more of an available group of trunk circuits.

Figure 2:
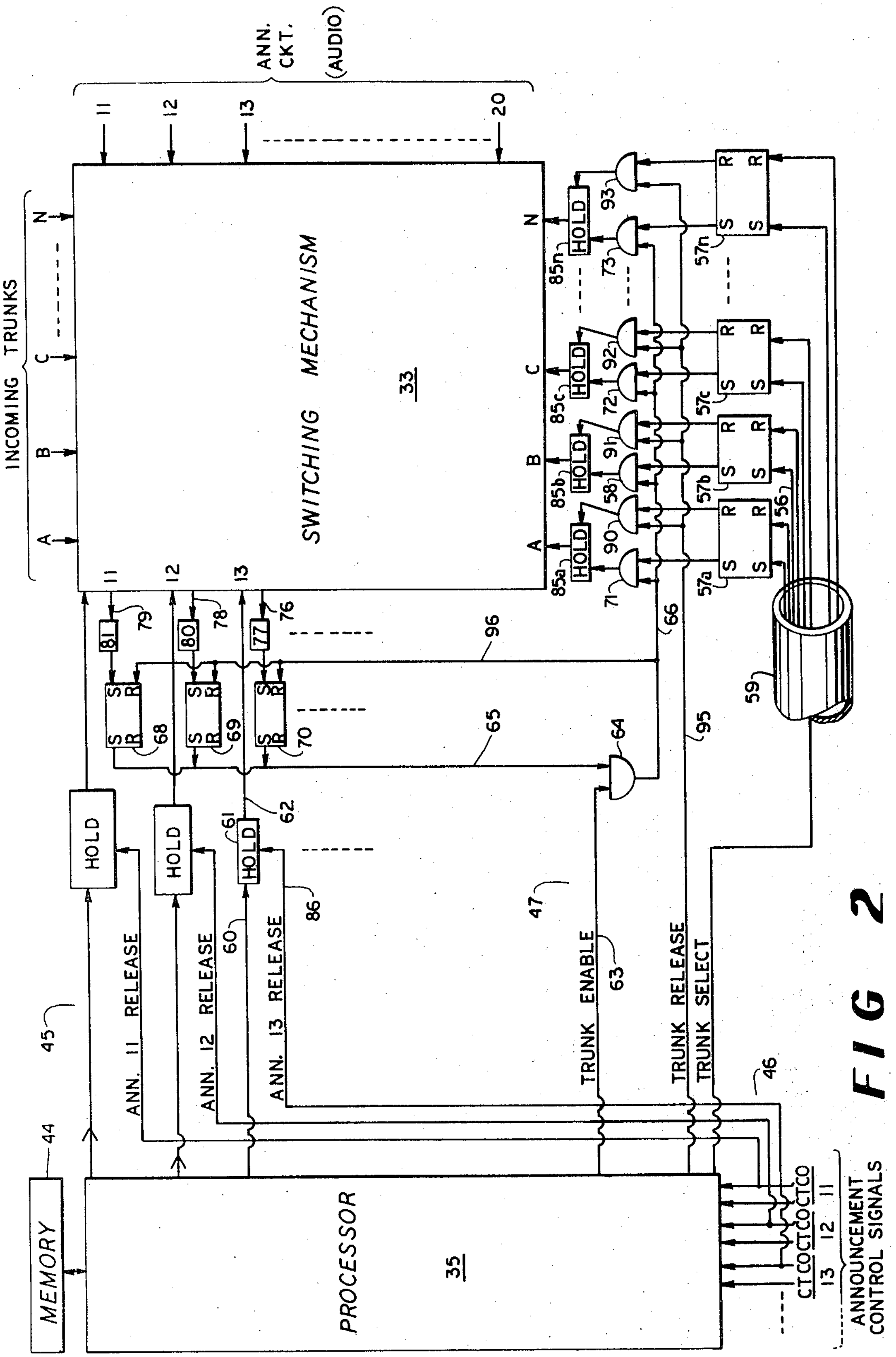

Many of the other objects and attendant advantages of the present invention will become more readily apparent from the following description of a working embodiment thereof, including the drawing, in which:

FIG. 1 is a schematic block diagram of an embodiment of the present invention; and FIG. 2 is a schematic block diagram illustrating switching control of the embodiment of FIG. 1.

Stated generally, the present invention provides selective interconnection between one or more of a group of incoming trunk circuits and the desired message announcement circuit corresponding to the subscriber-dialed number which resulted in the selection of the trunk circuit. While the available trunk circuits are dedicated to message announcement service generally, none of the trunks is dedicated to a particular announcement service and any one or more of the trunk circuits in the group can be connected to a predetermined one of the available announcement circuits. Provision is made for decoding the dialed number to determine which message announcement is desired, and memory capability remembers the identities of all trunk circuits to be connected with a particular announcement circuit until the announcement circuit delivers a signal indicating that the switching interconnection between the announcement circuit and the awaiting trunk circuits is to be made in anticipation of the beginning of a complete message announcement.

More particularly, in reference taken to the disclosed embodiment of the present invention and to FIG. 1 of the drawing, there is shown a multichannel switching system indicated generally at 30 and connected to receive a plurality of incoming announcement trunks individually identified A, B, C, . . .N and collectively identified by the numeral 31. It will be understood that the announcement trunks 31 in the present embodiment are connected to conventional telephone central office switching apparatus. The system 30 is also connected to receive a multiple number of message announcement circuits collectively indicated at 32 and individually designated as "Announcement Circuit 11", "Announcement Circuit 12", and so on, for a total of ten message announcement circuits in the embodiment disclosed herein. In a typical multiple message announcement system according to the present invention, the number of announcement trunks 31 will be sufficiently large so as to require an entire central office NNX code to be dedicated to the announcement trunks. Moreover, a separate numerical code of the remaining four digits of a subscriber number is designated corresponding to each individual one of the announcement circuits 32. For example, a person desiring to receive the message announcement present on Announcement Circuit 11 could dial NNX–11NN, while a person desiring to receive the message announcement delivered on Announcement Circuit 12 would dial NNX–12NN, and so on. In either of the foregoing examples, the calling party would be connected by the telephone central office equipment, operating in response only to the NNX portion of the dialed number, to any idle one of the announcement trunks 31. The central office switching equipment need not differentiate between the remaining four digits of the dialed number, since this function is provided by the system according to the present invention.

Selective interconnection between the announcement trunks 31 and the message announcement circuits 32 is provided by a suitable switch apparatus 33 which is selectively operable to interconnect any of the announcement circuits 32 with any one or a plurality of the announcement trunks 31. The switching mechanism 33 may be provided by any suitable switching device or apparatus which is operable to provide the necessary switching interconnection, one such apparatus being the conventional crossbar switch known to those skilled in the art. The actual operation of the switching mechanism 33 occurs at the command of the switching system according to the present invention.

Each of the announcement trunks is connected through lines collectively designated 34 to a processor 35, the operation of which is explained in greater detail below. Each of the announcement trunks is also selectively individually connectable through switch 36 and connection 38 to the multifrequency decoder 37, with operation of the switch 36 being at the control of the processor 35 as indicated through control line 39. The output of the multifrequency decoder 37 is supplied through connection 40 to the processor 35. The processor 35 is also provided with a memory 44 for a purpose to be disclosed below, and the memory may be provided by suitable apparatus such as magnetic drum storage or the like. It will also become apparent that the memory can be proportionately associated with the announcement trunks 31 rather than being provided as a unitary, separate article.

The control of the switching mechanism 33 is accomplished by the processor 35 through control line 45, it being understood that a crossbar switch, for example, actually requires that a pair of relay coils be energized to accomplish a particular switching function and that the control line 45 in FIG. 1 is a functional showing. The design and operation of crossbar switches per se are well known to those skilled in the art and need not be described further herein. The processor 35 may be provided by a general-purpose digital computer, with so-called "mini-computers" being particularly practical as an economical processor for use in the combination of the present invention. Programming such a computer to provide the operative functions described herein is within the abilities of the programmer of ordinary skill in the art.

Message announcement systems of the type described, for example, in the pending patent application identified above frequently are equipped to provide control pulses signifying the commencement and the conclusion of the recorded message being delivered. Such control pulses, which may be provided for each of the announcement circuits collectively indicated herein at 32 and which are supplied to the processor 35 by way of connection 46, may include a cut through or "CT" pulse which is delivered immediately preceding commencement of a particular announcement, and a cut off or "CO" pulse which is provided at the conclusion of that announcement. As is known to those skilled in the art, the CO pulse may be used to cause or initiate disconnection of a trunk circuit previously connected to receive the just-completed message, and the CT pulse may be used to connect the forthcoming announcement to another trunk circuit which is awaiting that announcement.

Considering the operation of the embodiment as described thus far, assume that a person who desires to receive the message announcement provided by announcement circuit 13 has dialed NNX–13NN, the telephone number assigned to that particular message announcement. The dialed NNX code is recognized by the central office switching equipment as the code corresponding to the announcement trunk group 31, and so a connection will be established between the calling party and an idle one of the trunks A, B, C, . . .N which may comprise that trunk group (assuming, of course, that all of such trunks are not busy at that time). Arbitrarily assuming that the calling party has been connected by the central office to trunk B, for example, the processor 35 through the appropriate one of the control lines grouped at 34 is made aware of seizure of trunk B by the central office. At this time, the central office must be interrogated by the apparatus to determine the announcement number, that is, the XXNN code, which was dialed by the calling party. To accomplish this result, the processor through control line 39 causes the switch 36 to complete a circuit from trunk D through the connection 38 to the multifrequency decoder 37, this connection being denoted in FIG. 1 by the X at 50. An interrogation signal or "wink," as it is known to those skilled in the art, is applied by the processor to trunk B to instruct the central office to transmit along trunk B the XXNN code which was originally dialed.

The dialed-number signals transmitted along trunk B are supplied through the switch connection 50 and the connection 38 to the multifrequency decoder 37, where the central office frequency pulses or dial pulses are decoded to provide output signals corresponding to the XX portion of the dialed code number. These output signals are supplied through connection 40 to the processor 35, and the processor causes the XX digits to be stored in the memory 44 along with an appropriate signal identifying the seized trunk on which the XX code was received. In the particular example chosen, the memory 44 receives and stores signals indicating that seized trunk B is connected at the calling location to a party who has dialed XX code "13". The switch connection 50 of the switch 36 is now opened, and the multifrequency decoder 37 is free to be connected to any remaining seized trunk in the trunk group 31 which requires dialed signal decoding.

The present switching system now is connected with a seized trunk and knows what message announcement must be supplied to that trunk. Assuming that the message announcement on announcement circuit 13 is in progress at this time, and additionally assuming that the sponsor of that particular message does not desire the calling party to "barge in" or be connected in the middle of an ongoing announcement, the trunk B is not interconnected with the announcement circuit 13 at this time. Following the conclusion of the announcement in progress on announcement circuit 13, a CO pulse is produced by the announcement apparatus as described above, and this CO pulse is supplied through connection 46 to the processor 35. This CO pulse is followed, after a brief time delay, by a CT pulse from the announcement apparatus signifying that a new announcement message is about to commence. When the processor 35 receives the CT pulse for message announcement circuit 13, the memory 44 is searched for the identity of all seized trunks which have been previously determined to be awaiting connection with that particular message announcement circuit. The switching mechanism 33 is then controlled by the processor through the announcement circuit control connection 45 and the trunk circuit control connection 47 to establish interconnection between announcement circuit 13 and all such trunks. Thus, for example, trunk B is interconnected at this time with the message announcement circuit 13; since many other trunks in the trunk group 31 may have been awaiting interconnection with the announcement circuit 13, these other trunks are also interconnected to that message announcement circuit at the same time, and it will be appreciated that provision of a crossbar switch for the switching mechanism 33 is especially well-suited to multiple simultaneous parallel switching of this type.

The ability of the present switching system to evaluate the message announcement desired by a particular trunk, and to interconnect the awaiting trunks with the appropriate message announcement circuit, in the environment of multiple concurrent announcements which typically have staggered commencement and termination times, is obtained in substantial degree by the serial selection - parallel connection feature wherein all of the trunks awaiting interconnection with a particular message announcement circuit are serially selected for interconnection and are then simultaneously interconnected therewith. Apparatus for accomplishing the serial selectparallel connect operation according to the disclosed embodiment of the present invention is depicted in FIG. 2.

Considering first the circuitry for controlling the connection and release of the switching functions of switching mechanism 33 associated with the several incoming trunks, closure of each of the incoming trunk circuits is accomplished at the command of a buffer stage associated with the individual trunk circuit and operated at the control of the processor 35. Considering the previous example wherein trunk B is to be interconnected with the announcement circuit 13, the processor 35 is programmed to operate upon receipt of a CO pulse from the announcement apparatus signaling the conclusion of the preceeding message announcement on that circuit to initiate a search in the memory 44 of stored signals corresponding to all of the incoming trunk circuits to determine which of those circuits is awaiting interconnection with the announcement circuit 13. This interrogation of the memory 44 may be done serially, commencing with trunk A and extending through trunk N. When the processor 35 is informed by signals stored in the memory 44 that trunk B is awaiting such interconnection, a "trunk select" signal is supplied from the processor 35 along line 56 to the "set" input of flip-flop circuit 57*b*, thereby causing a logic "one" to appear at output S thereof. This signal from the flip-flop 57*b* is applied as an input to AND gate 58.

The foregoing interrogation process continues serially for all of the incoming announcement trunks A, B, C, . . .N, and it can be seen that there exists a flip-flop 57*a*, 57*b*, 57*c* . . . 57*n* corresponding to each of these trunks and associated with the switching mechanism 33 to drive the switching mechanism in a manner described below to establish circuit interconnection for the particular corresponding trunk. During the time of the foregoing serial interrogation, each of the series-57 flip-flops which receives a "trunk select" signal is driven to a "set" position by a corresponding set line from the processor 35 and collectively designated as the trunk select line 59. The series-57 flip-flops thus comprise a buffer stage into which is serially fed signals indicating the identity of trunks awaiting interconnection with a particular announcement circuit.

The buffer circuitry associated with the trunk select portion of the switching mechanism 33 is now ready to be controlled by the processor 35 for parallel interconnection. This control occurs following receipt by the processor 35 of a CT pulse for the message announcement circuit 13. The processor 35 is programmed to operate, responsive to receipt of the CT pulse associated with the message announcement circuit 13, in the example chosen, to supply an announcement circuit enabling signal through the line 60 associated with the announcement circuit 13 to a HOLD circuit 61. The HOLD circuit 61 maintains a signal on line 62 connected to the switching mechanism 33 to control actuation of the switching link carrying the message announcement circuit 13. At the same time and also in response to the CT signal associated with message announcement circuit 13, the processor 35 is programmed to supply an enable pulse over the trunk enable line 63. The trunk enable signal is applied to AND gate 64, which has an additional input connected to receive the "set" outputs of all of the flip-flops 68, 69, 70 ... respectively associated with the switching links of the message announcement circuits. The output of the AND gate 64 is connected through parallel-enable line 66 as an input to the AND gate 58, associated with announcement trunk B, and also to the corresponding AND gates 71, 72, . . .73 respectively associated with the remainder of the incoming trunks.

In the operation of the embodiment disclosed herein, parallel switching of the incoming trunk circuits awaiting interconnection with a particular message announcement circuit does not occur until the switching link associated with that message announcement circuit has been closed. Closure of the particular message announcement switching link is signalled by an output provided from the switching mechanism 33 and denoted at 76 for the message announcement circuit 13. This announcement circuit closure signal goes to a pulse forming circuit 77, whereat an output pulse is provided and supplied to the flip-flop 70. The pulse forming circuit 77 may be any suitable circuit, such as a one-shot multivibrator, which produces a defined output pulse in response to reception of an input signal. Similar switch closure lines 78, 79 and pulse-forming circuits 80, 81 are shown associated with the message announcement circuits 11 and 12, and it will be understood that such circuitry exists for each of the remaining message announcement circuit switching links not depicted in FIG. 2.

When the flip-flop 70 assumes a "set" state in response to a signal on the line 76 denoting the closure of the switching link for the announcement circuit 13, the "set" output of that flip-flop is applied to the line 65 connected as an input to the AND gate 64. The AND gate 64 is already receiving a "trunk enable" signal from line 63, and so an output signal occurs from the AND gate 64 of the parallel-enable 66. The AND gate 58 thus now receives an input both from the line 66 and from the "set" output of the flip-flop **57*b*, which was previously set by a signal received on the set line 56 during the serial-select phase of operation. The AND gate 58 thus produces an output signal to the HOLD circuit 85*b*, which in turn applies and maintains a signal driving the switching mechanism 33 to close the switching link associated with the announcement trunk B. It will be appreciated that the occurrence of a trunk enable signal on the parallel-enable line 66 causes concurrent application of switching mechanism driving signals for any other trunk circuit which was previously conditioned for parallel switch by having the associated buffer flip-flop circuit 57*a*, 57*c*, . . . 57*n*** placed in the "set" state during the earlier-occurring serial-select operation.

At the time a trunk enable signal is transmitted along the parallel-enable line 66, this signal is also applied along a line 96 to reset the flip-flop 70 which was previously "set" in response to closure of the message announcement 13 switching link. This causes the line 65 to be cleared of a "set" signal from a particular message announcement circuit immediately after the parallel trunk enable signal has been provided for that message announcement circuit, thereby clearing the line 65 of a "set" signal in anticipation of the next operation of the switching mechanism 33 corresponding to another message announcement circuit.

The incoming announcement trunk B, as well as any other trunk which desired interconnection thereto, are thus simultaneously interconnected with the message announcement circuit 13, and the calling party on trunk B and on any other interconnected trunks will receive the message associated with that announcement circuit. At the conclusion of the message announcement, a CO pulse corresponding to message announcement circuit 13 is again supplied by the announcement apparatus; this CO pulse is supplied through line 46 to the processor 35 and is also applied directly through the line 86 to release the HOLD circuit 61 and thus to remove from the line 62 the signal which was previously maintained to keep the announcement circuit 13 switching link actuated. The announcement circuit 13 is thus removed from its previous interconnection with any incoming announcement trunks.

At the same time, the processor 35 is programmed to function in response to the CO pulse of message announcement circuit 13 to search the memory 44 in a serial manner to determine which of the incoming announcement trunks was previously interconnected with the message announcement circuit 13. The processor 35 is programmed to provide along the trunk select line 59 a "reset" signal to the flip-flop **57*b* (and to any other series-57 flip-flop corresponding to incoming trunks which were previously interconnected with the message announcement circuit 13) causing that flip-flop to shift to the "reset" state. The flip-flop 57*b* thus now applies a signal from the R output to AND gate 91, it being understood that additional AND gates 90, 92 . . .93 are similarly provided for the other of the incoming announcement trunks switching circuits. The output of each of the AND gates 90, 91, 92 . . .93 is connected to effect release of the corresponding HOLD circuits 85*a*–85*n***.

When the serial inquiry of the memory 44 has been completed to determine which of the incoming trunks is to be released from previous switching interconnection with the message announcement circuit 13, a "trunk release" signal is applied along the line 95. This trunk release signal is applied in parallel to all of the AND gates 90, 91, 92 . . .93, and each of those AND gates which is also receiving an input from a corresponding flip-flop **57*a*–57*n* which has been placed in the "reset" state, now provides an output to the release gate of the corresponding HOLD circuit to cause that circuit to terminate the trunk switching link engage signal previously maintained by the HOLD circuit. In this manner, it can be seen that parallel or concurrent disconnect occurs for all of the incoming trunks which were previously interconnected in parallel to receive the message on the message announcement circuit 13, and the buffer stage comprised by the series-57 flip-flops is reset to receive "set" signals for the next interconnect operation. The apparatus is now in condition to repeat the serial select-parallel enable switching arrangement with regard to the message announcement circuit 13. Trunk B and all other trunks which were previously connected with the announcement circuit 13 are now free to receive additional incoming calls, and the announcement circuit 13 is ready to be interconnected with any trunk circuits which were seized during delivery of the preceding message on that announcement circuit and which delivered a 13**NN four-digit code.

It will be understood that a comparable serial select-parallel enable process is occurring under the control of the processor 35 for each of the other available message announcement circuits. Since the announcements delivered on such circuits may commence and terminate at times which are offset with regard to each other, it can be seen that the processor 35, which need only perform the serial select-parallel enable operations during the relatively short interval of time commencing with the CO pulse and ending with the CT pulse for a particular message announcement circuit, is able to provide the foregoing control operations for each of the message announcement circuits in its respective turn.

Multiple message announcement systems can also operate to commence a number of different messages simultaneously, with the message announcement circuits being interconnected with one or more different trunks as determined by the stored XX code associated with each trunk. The need to accomplish trunk selection for a number of message announcement circuits within the time interval between the CO pulses and the subsequent common (or concurrent) CT pulse places greater demands on the capacity of the processor, and the use of memory capacity associated with the several trunk circuits to store the XX code information associated with that trunk may lessen the operational workload of the processor.

Although only a single multifrequency decoder 37 is depicted, a number of such multifrequency decoders fewer than the total number of incoming trunks may be provided with a system of this type, with all of such decoders being connectable through suitable switching with any of the trunk circuits 31. Since decoder connection to a particular turnk is necessary only for the brief interval of time required to decode the incoming four-digit code, the total number of multifrequency decoders can be less than the total number of incoming announcement trunks. It will be understood by those skilled in the art that the term "multifrequency decoder" as herein used refers to apparatus capable of decoding either multifrequency or dial pulse signals, and that such decoders are known in the art.

It will be understood that the foregoing relates only to a preferred embodiment of the present invention and that numerous modifications and alterations may be made therein without departing from the spirit and the scope of the invention as set forth in the appended claims.

We claim:

1. Apparatus for selective switching between plural message circuits each of which supplies a message and plural message receiving circuits, comprising:
- means connected to receive a first set of plural inputs corresponding to plural message circuits and connected to receive a second set of plural inputs corresponding to plural message receiving circuits;
- said means being selectively operable to establish circuit interconnection between one of said inputs of said first set and at least one of said inputs of said second set;
- control means operative in response to the presence of an operative condition indicating message seeking connection to at least one of said message receiving circuits to supply an interrogation signal to said one message receiving circuit requesting delivery of a signal corresponding to the identity of a certain message circuit sought to be connected to said one message receiving circuit;
- means operative in response to said control means and said delivered signal to establish circuit interconnection through said first-mentioned means between said certain message circuit and said one message receiving circuit;
- said last-mentioned means including memory means operative to store information corresponding to the identity of said message receiving circuit and also corresponding to said delivered signal identifying said certain message circuit sought to be connected thereto;
- said control means connected to be operative in response to a message delivery control signal corresponding to occurrence of a predetermined certain event on said certain message circuit to cause said circuit interconnection means to establish said circuit interconnection between the message circuit and the message receiving circuit determined by said stored information.

2. Apparatus as in claim 1, wherein:
- said control means is operative in response to the presence of said operative condition on each of a plurality of said message receiving circuits to supply an interrogation signal to each one of said plurality of message receiving circuits requesting delivery of a signal corresponding to the respective identity of the message circuit sought to be connected to each one of said plurality of message receiving circuits;
- said memory means being operative to store information corresponding to the respective identities of said plurality of message receiving circuits and the respective delivered signals identifying said message circuits sought to be connected thereto;
- said control means connected to be operative in response to a message delivery control signal corresponding to the occurrence of a predetermined certain event on a certain one of said message circuits and additionally in response to information stored in said memory means to cause said circuit interconnection means to establish said circuit interconnection between said certain message circuit and all of the message receiving circuits in said plurality of message receiving circuits which provided signals identifying said certain message circuit.

3. Apparatus as in claim 2, wherein:
- said control means includes means operative in response to said message delivery control signal to provide substantially simultaneous circuit interconnection between said certain message circuit and all of said identified message receiving circuits.

4. Apparatus as in claim 3, comprising:
- buffer means operatively interposed between said control means and said circuit interconnecting means and selectively operative in response to said stored information in said memory means to assume a temporary preset state corresponding to the identities of message receiving circuits seeking interconnection to said certain message circuit;
- message receiving circuit driving means operatively associated with said circuit interconnecting means and connected to be responsive to said temporary preset state for placing selected ones of said message receiving circuits in a message receiving state;
- said buffer means and said message receiving circuit driving means connected to be operative in response to said message delivery control signal to substantially simultaneously control said circuit interconnecting means to place all of said message receiving circuits identified by said temporary preset state of the buffer means in a message receiving state.

5. Apparatus as in claim 4, further comprising:
- message circuit driving means associated with said circuit interconnecting means and operative in response to said message delivery control signal on said certain message circuit to place said certain message circuit in a message delivery state.

6. Apparatus as in claim 5, wherein:
- said message receiving circuit driving means is operatively connected with said message circuit driving means to place said message receiving circuits in said message receiving state after said certain message circuit is placed in said message delivery state.

7. Apparatus as in claim 2, in which each message circuit periodically provides a message termination control signal indicative of the termination of message delivery on said message circuit, and wherein:
- said control means is connected to be operative in response to a message termination control signal corresponding to a certain message circuit to simultaneously terminate all the established circuit interconnections between said certain message circuit and said identified message receiving circuits.

8. Apparatus as in claim 3, in which each message circuit periodically provides a message termination control signal indicative of the termination of message delivery on said message circuit, and wherein:

said control means is connected to be operative in response to a message termination control signal corresponding to a certain message circuit to simultaneously terminate all of the established circuit interconnections between said certain message circuit and said identified message receiving circuits.

9. Apparatus as in claim 4, wherein said buffer means is operative in response to a signal from said control means subsequent to completion of said circuit interconnection to terminate said preset condition and to be available for other message receiving circuit interconnections.

10. Message announcement switching apparatus for establishing selective interconnection between one or more of plural message receiving telephone trunk circuits and a selected one of plural available message circuits which periodically provide a message delivery control signal corresponding to a certain message delivery event, comprising:

interconnection means connected to receive all of said trunk circuits and also connected to receive all of said message circuits, said interconnection means being selectively operable to establish message delivery circuit interconnection between any of said message circuits and one or more of said trunk circuits;

means connected to be responsive to the seizure of any of said trunk circuits by telephone central office equipment for operative association with the seized trunk circuit to supply an interrogation signal to said seized trunk circuit and to receive a signal delivered in response to said interrogation signal and corresponding to the identity of a certain one of said message circuits sought to be interconnected with said seized trunk circuit;

memory means operatively connected to receive and store information signals identifying said seized trunk circuits and signals identifying the message circuit sought by each such trunk circuit;

control means connected to be responsive to message delivery control signals corresponding to a message delivery event on each of said message circuits; and said control means operatively connected with said switching means and said memory means to establish a first message delivery circuit interconnection between a selected one of said message circuits in response to the periodic occurrence of a message delivery control signal therefrom and between all of the seized trunk circuits identified by signals stored in said memory means subsequent to the immediately preceding such message delivery control signal as seeking interconnection with said selected message circuit.

11. Apparatus as in claim 10, wherein:

said interrogation means is operative after and in response to the delivery of said message identity signal from a seized trunk circuit to become available for operative interrogation association with another of said trunk circuits.

12. Apparatus as in claim 10, wherein:

said control means is operative after said first message delivery circuit interconnection to control said switching means to establish a second message delivery circuit interconnection between a selected other one of said message circuits in response to the periodic occurrence of another message delivery control signal from said other message circuit and all of the seized trunk circuits identified by signals stored in said memory means subsequent to the immediately preceding such other message delivery control signal as seeking interconnection with said other message circuit.

13. Apparatus as in claim 12, in which each message circuit periodically provides a message termination control signal corresponding to termination of message delivery, and further comprising:

first signal responsive means operative in response to a message termination signal from said selected one message circuit to terminate said first message delivery circuit interconnection.

14. Apparatus as in claim 13, further comprising:

second signal responsive means operative in response to a message termination signal from said selected other message circuit to terminate said second message delivery circuit interconnection.

15. The method of selecting one of an available plurality of message announcement circuits for interconnection with at least one trunk circuit which is dedicated for service with said plurality of message announcement circuits, comprising the steps of:

providing a plurality of trunk circuits each of which is selectively connectable to any one of a plural number of possible subscribers in response to a predetermined first signal common to all of said message announcement circuits and none of which trunk circuits are dedicated to connection with a particular one of said plurality of message announcement circuits;

examining each of said trunk circuits which becomes selectively connected to a subscriber to obtain a second signal which uniquely identifies a particular one of said message announcement circuits; and connecting said subscriber-connected trunk circuit to said particular message announcement circuit in response to said unique second signal and at a time which is determined by said particular message announcement circuit.

16. The method of claim 15, further comprising:

examining each of a number of said trunk circuits which have been connected to subscribers to obtain the corresponding second signals which uniquely identify the particular message announcements desired by such subscribers; and simultaneously connecting to a particular message announcement circuit all of said subscriber-connected trunk circuits identified by said second signals as desiring connection thereto.

17. The method of Claim 16 wherein:

said step of simultaneous connection occurs at a time which is determined by said particular message announcement circuit.

18. The method of claim 16, comprising the further step of:

subsequently simultaneously disconnecting all of said subscriber-connected trunk circuits from said particular message announcement circuit in response to a signal from said particular message announcement circuit.

* * * * *